Figure 1:
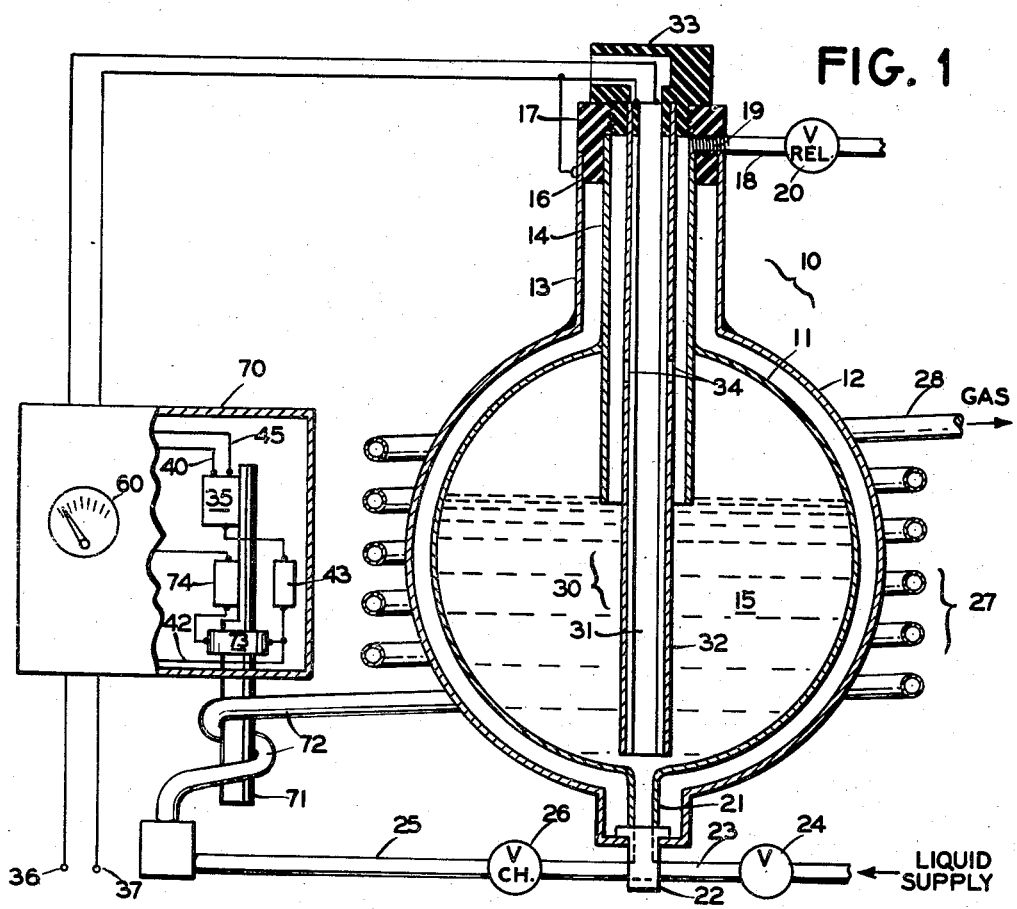

April 21, 1959

G. V. ZITO 2,882,728

LIQUID OXYGEN DEPTH INDICATING SYSTEM

Filed April 6, 1955

INVENTOR.
GEORGE V. ZITO
BY
*Geo. G. Hyde*
ATTORNEY

United States Patent Office 2,882,728
Patented Apr. 21, 1959

2,882,728

LIQUID OXYGEN DEPTH INDICATING SYSTEM

George V. Zito, Northvale, N.J., assignor to Bendix Aviation Corporation, Teterboro, N.J., a corporation of Delaware Application April 6, 1955, Serial No. 499,580

13 Claims. (Cl. 73—304)

This invention relates to liquid depth gauge systems of the electrical remote reading type employing an immersed condenser whose capacity varies with liquid depth.

An object of the invention is to provide an improved condenser construction, and in particular one especially suitable for use in a container having a restricted opening. A specific object is to provide a novel condenser particularly adapted for use in a container for liquefied gas, such as oxygen, which is normally insulated and is suitable for use as a source of gas.

Another purpose is to provide an improved condenser structure of the indicated type that is especially adapted for mounting in the neck of a container for use in measuring the liquid level in the container.

A further object is to provide a novel liquid depth indicating electrical system including a capacitive depth gauge element, and more particularly a new circuit for an immersed condenser and depth indicator. A particular object is to employ circuit elements whose operation is improved by uniform temperature, and to provide means for maintaining the elements at such temperature, including heat transfer means connected to and thermally affected by the liquid container and its associated circulation system.

A related object is to utilize the lower temperature of fluid in or from the container to reduce the temperature of circuit elements. Another object is to utilize a heat conducting member maintained in heat transfer relation to said fluid and circuit elements. A further purpose is to employ thermostatic means for maintaining a balanced relation between circuit element heating means and cooling means of the indicated type.

The foregoing and other objects, purposes and advantages of the invention will appear more fully from consideration of the detailed description which follows, in conjunction with the accompanying drawing wherein one embodiment of the invention is illustrated. It is to be expressly understood, however, that the drawing is for the purposes of illustration and description, and is not to be construed as defining the limits of the invention.

Figure 2:
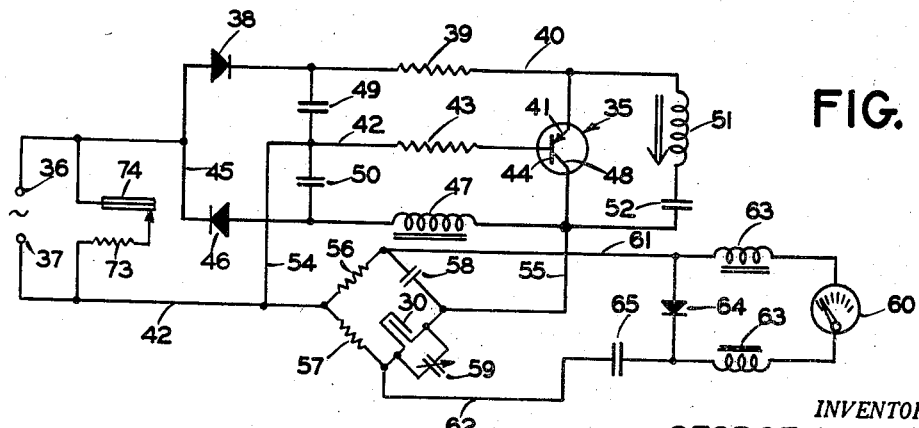

In the drawing:

Fig. 1 is a partly diagrammatic showing of a container for liquefied gas, shown in vertical central cross-section, together with an associated evaporating coil and a liquid level indicating circuit, including a casing with the cover partly broken away to show circuit elements; and Fig. 2 is a schematic diagram of the indicating circuit.

The liquefied gas container 10, as shown in central section, does not include various elements and parts which are employed in standard commercial units of this type, and particularly in liquid oxygen containers, since such parts are not relevant to the invention and are omitted for the sake of clarity. However, it is understood that the container 10 and associated elements will be provided in practice with parts and accessories required for efficient operation and well known to those skilled in the art.

In the simplified form shown in Fig. 1, container 10 includes an inner shell 11, generally spherical in form, and an outer shell 12 of similar form and spaced from the inner shell, the intervening space providing insulation and advantageously being evacuated. A cylindrical neck 13 extends upwardly from outer shell 12, and is similarly spaced from gas outlet tube 14 sealed to the inner shell 11 and extending downwardly to the maximum level of the liquefied gas 15.

The space between neck 13 and tube 14 is sealed by a downward annular extension 16 of cap 17, into which the upper ends of said neck and tube are sealed. Gas discharge pipe 18, mounted in an opening 19 in cap 17 communicating with the interior of tube 14, carries a relief valve 20 which is set to prevent the development of excessive pressure within container 10. The lower end of the inner shell 11 is connected through liquid passage 21 and fitting 22 with liquid supply line 23 controlled by valve 24, and liquid outlet line 25 provided with check valve 26 and connected to an evaporation passage or conduit in the form of a coil 27 having a gas outlet 28 extending to the gas utilization system, which may comprise a relief valve and regulators as shown in Patent No. 2,576,985, Wildhack, December 4, 1951.

An arrangement is provided for indicating at a remote point the level of the liquid 15 in container 10. Said arrangement is of the type which employs a condenser immersed in the liquid, the capacity of the condenser varying with changes in liquid level, said changes being utilized through an appropriate circuit to actuate a liquid level indicator. In the form illustrated, the immersed condenser 30 comprises a central rod 31 and a parallel tube 32 uniformly spaced from the rod, said tube and rod extending within the gas outlet tube 14 substantially to the bottom of inner shell 11, and being mouned in uniformly spaced relation at their upper ends in plug 33 of insulating material threaded into cap 17. Tube 32 is provided with openings 34 connecting the spaces at opposite sides of said tube at points within tube 14 and above the level of liquid 15. The arrangement is such that said liquid will maintain a level between rod 31 and condenser tube 32 identical with its level outside of the latter tube.

An electrical circuit system is connected to condenser 30 for indicating the level of liquid 15. Various circuits of this type are known and may be employed. However, a circuit that is particularly efficient and adapted for use with a structure of the type described is illustrated in the drawing, being shown schematically in Fig. 2. It includes an oscillator connected across a bridge circuit, one arm of which includes condenser 30, and an indicator operated by unbalance of the bridge due to variations in the capacity of condenser 30 reflecting changes in liquid level.

In the form illustrated, an oscillator circuit employing a transistor 35 is connected to terminals 36, 37 of a source of alternating current, terminal 36 being connected through rectifier 38 and resistor 39 in lead 40 to the emitter 41 of transistor 35, while terminal 37 is connected through lead 42 and resistor 43 to the transistor base 44. Terminal 36 is also connected through lead 45, rectifier 46 and choke coil 47 to the collector 48 of the transistor 35. Rectifiers 38, 46 are properly poled to provide the correct potentials on said emitter and collector respectively.

A suitable circuit is provided for utilizing transistor 35 to generate oscillations. In the form illustrated, leads 40 and 45 are connected to the base lead 42 through condensers 49, 50 respectively; and a tuned resonant circuit including inductance 51 and condenser 52 in series is connected across said emitter 41 and collector 48, the form illustrated employing a slug-tuned inductance 51.

The oscillations generated by the circuit of transistor 35 are applied across bridge 53, the arrangement illustrated employing leads 54, 55 from opposite bridge corners connected to lead 42 and to collector 48 respectively. Bridge 53 includes balancing resistors 56, 57 in the arms connected to lead 54, and condensers 58 and 30 in the arms connected to lead 55, a suitable adjusting arrangement, such as trimmer condenser 59 in parallel with condenser 30, being advantageously provided to balance the bridge accurately when there is no liquid in container 10.

The other corners of the bridge are connected across a suitable indicator which shows the degree of bridge unbalance and is calibrated to indicate the amount of liquid 15 in container 10. In the illustrated circuit an indicator 60 of the ammeter type is connected to the latter corners through leads 61, 62 containing choke coils 63 to block radio frequency currents, with a rectifier 64 across said leads 61, 62 and a blocking condenser 65 in lead 62. With this arrangement changes in the level of liquid 15 will produce corresponding changes in the capacity of condenser 30, resulting in bridge unbalance and a corresponding current through leads 61, 62 and meter 60 which will produce a reading at a remote point showing the level of said liquid.

The efficient and uniform operation of a circuit of the type indicated, and in particular of a circuit employing a transistor, is substantially improved by maintaining the transistor at a uniform temperature, or within a restricted temperature range. Since the transistor and associated elements of its circuit must be enclosed in a casing, which advantageously is as small as may be mechanically and electrically practical, the heat generated by said arrangement in the casing tends to affect the transistor operation, and must be kept within a temperature range in which the transistor operation will be satisfactory.

An arrangement is provided for this purpose, including means for controlled cooling of the disclosed circuit elements, the arrangement shown being particularly adapted for use with liquefied gas containers of the type shown and described. In the specific form illustrated, the circuit elements are mounted in a casing 70 which has been conventionalized and greatly enlarged for simplicity of illustration. A rod 71 of metal having high thermal conductivity, such as copper or aluminum (the latter advantageously copper plated), extends through a wall of casing 70. A portion of the liquid evaporating system is placed in intimate heat-transferring relationship to said rod 71, the form illustrated including a turn 72 of the evaporating coil 27 extending around and in intimate contact with rod 71; and juxtaposed faces of said rod in turn may be suitably contoured to assure the necessary heat conducting surface contact. The inner portion of rod 71 in casing 70 is in intimate heat conducting contact with transistor 35, which may be mounted on rod 71. An electrical heating element 73 is mounted on rod 71 and connected to a bimetallic thermostat 74, likewise in close heat transferring contact with said rod, and advantageously mounted thereon. Heater 73 and thermostat 74 are connected across line terminals 36, 37, as shown in Fig. 2.

With this arrangement, if the temperature of rod 71, which is in contact with the transistor 35 and regulates its temperature, is below the optimum value or range, said temperature will close thermostat 74 and energize heater 73 to raise the rod temperature to said value or range. If the temperature of rod 71 in contact with transistor 35 is higher than desirable, thermostat 74 will be opened, and turn 72 of the liquid evaporating system, which is at a relatively low temperature, will absorb heat from rod 71 and reduce its temperature to the required value or range. In this manner transisotr 35 will be maintained at a temperature at which its operation is most efficient and uniform, providing improved accuracy of operation of indicator 60.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a system containing a frigid liquefied substance, apparatus responsive to variations in a condition in said system comprising electrical means responsive to said condition, including an element variable in operation at different temperatures, and means for maintaining said element at substantially uniform temperature, comprising cooling means including a circulation passage for said substance.

2. In a system containing a frigid liquefied substance, apparatus responsive to variations in a condition in said system comprising electrical means responsive to said condition, including an element variable in operation at different temperatures, and means for maintaining said element at substantially uniform temperature, comprising cooling means including a circulation passage for said substance and a heat conducting member in heat transfer relation to said passage and element.

3. In a system containing a frigid liquefied substance, apparatus responsive to variations in a condition in said system comprising electrical means responsive to said condition, including an element variable in operation at different temperatures, and means for maintaining said element at substantially uniform temperature, comprising cooling means including a circulation passage for said substance, heating means, and thermostatic means controlling said heating means.

4. In a system containing a frigid liquefied substance, apparatus responsive to variations in a condition in said system comprising electrical means responsive to said condition, including a transistor affected in operation by changes in temperature, and means for maintaining said transistor at substantially uniform temperature, comprising cooling means including a circulation passage for said substance and in heat transfer relation to said transistor, heating means in heat transfer relation to said transistor, and thermostatic means controlling said heating means.

5. In a system containing a frigid liquefied gas, apparatus responsive to variations in a condition in said system comprising electrical means responsive to said condition, including a transistor affected in operation by changes in temperature, and means for maintaining said transistor at substantially uniform temperature, comprising an evaporating passage for said liquefied gas connected to said system and located in heat transfer relation to the transistor, heating means in heat transfer relation to said transistor, and thermostatic means controlling said heating means.

6. Apparatus responsive to variations in a condition in a system containing a frigid liquefied gas, comprising electrical means responsive to said condition, including a transistor affected in operation by changes in temperature, and means for maintaining said transistor at substantially uniform temperature, comprising cooling means including an evaporating conduit for said liquefied gas connected to said system, a heat transfer member in heat transfer relation to said conduit and transistor, a heating element in heat transfer relation to said member, and thermostatic means for controlling said heating means.

7. In a system containing a frigid liquefied substance, apparatus responsive to variations in a condition in said system comprising electrical means responsive to said condition, including a bridge circuit having a variable impedance in an arm varying in accordance with changes in said condition, a bridge energizing oscillator circuit including a transistor, and means for maintaining said transistor at uniform temperature, comprising cooling means including a circulation passage for said substance in heat transfer relation to the transistor, heating means in heat transfer relation ot said transistor, and thermostatic means for controlling the heating means.

8. Apparatus responsive to variations in a condition in a system containing a frigid liquefied substance, comprising means responsive to said condition, a casing, an electrical circuit actuated by said responsive means and including a plurality of components in said casing, and means for cooling said components, comprising a heat conducting member having a portion in heat transfer relation to said components in the casing and a portion outside of the casing, and means for adjusting the temperature of the components, including cooling means comprising a passage for said frigid substance in heat transfer relation with said outside portion of said member.

9. In a system containing a frigid liquefied substance, apparatus responsive to variations in a condition in said system comprising means responsive to said condition, a casing, an electrical circuit actuated by said responsive means and including a plurality of components in said casing, and means for cooling said components, comprising a heat conducting member having a portion in heat transfer relation to said components in the casing and a portion outside of the casing, and means for adjusting the temperature of the components, including cooling means comprising a container for said liquefied substance and an evaporation conduit for said substance having an inlet connected to the container and extending along said outside portion of the heat conducting member in heat transfer relation thereto.

10. Apparatus responsive to variations in a condition in a system containing a frigid liquefied substance comprising means responsive to said condition, a casing, an electrical circuit actuated by said responsive means and including a plurality of components in said casing, and means for maintaining uniform temperature of said components in the casing, comprising a heat conducting member having a portion in heat transfer relation to said components in the casing and a portion outside of the casing, heating means in the casing, thermostatic control means for said heating means located in the casing, and cooling means comprising a passage for said frigid substance in heat transfer relation with said outside portion of said member.

11. A depth indicating system for frigid liquefied gas in a container, comprising a condenser element mounted vertically in said container in position for variable immersion in said liquefied gas as the level thereof changes, arranged for corresponding changes in the capacity of said condenser, and means for converting said changes in capacity into depth indications, comprising an indicator circuit connected to said condenser element and including a part variable in operation at different temperatures, and means for maintaining said part at substantially uniform temperature, comprising cooling means including a circulation passage for said gas connected to said system.

12. A system for measuring a varying amount of frigid liquefied gas in a container, comprising an immersion condenser mounted in the container, electrical circuit means responsive to variations in the capacity of said condenser when the liquid level changes, including a transistor unit variable in operation at different temperatures, and means for maintaining said unit at a substantially uniform temperature, comprising a conduit for said gas connected to the container and extending in heat-absorbing relation to said transistor unit, a heating element in heat-conducting relation to said unit, and thermostatic means for controlling the heating element.

13. A system for measuring a varying amount of frigid liquefied gas, a container, means for conducting evaporated gas from said container including an evaporating coil, and means for measuring the liquid in said container, comprising an immersion condenser mounted vertically in the container, electrical control means responsive to variations in the capacity of said condenser when the liquid level changes, including a transistor unit variable in operation at different temperatures, and means for maintaining said unit at a substantially uniform temperature, comprising a portion of said evaporating coil located in heat-absorbing relation to said transistor unit, a heating element in heat-conducting relationship to said unit, and thermostatic means for controlling the heating element.

References Cited in the file of this patent

UNITED STATES PATENTS

| | | |
|---|---|---|
| 1,658,953 | Theremin | Feb. 14, 1928 |
| 1,873,838 | Gebhard | Aug. 23, 1932 |
| 1,904,771 | Hentschel | Apr. 18, 1933 |
| 2,638,000 | Sontheimer | May 12, 1952 |

FOREIGN PATENTS

| | | |
|---|---|---|
| 21,662 | Austria | May 15, 1930 |

OTHER REFERENCES

The Review of Scientific Instruments, vol. 25, No. 2, February 1954, pp. 112–114.